United States Patent
Chang et al.

(10) Patent No.: US 10,149,303 B2
(45) Date of Patent: Dec. 4, 2018

(54) METHOD AND APPARATUS FOR INTERFERENCE-AWARE RESOURCE-SHARING SCHEME FOR MULTIPLE D2D GROUP COMMUNICATIONS UNDERLAYING CELLULAR NETWORKS

(71) Applicant: INHA—Industry Partnership Institute, Nam-gu (KR)

(72) Inventors: Kyung Hi Chang, Mapo-gu (KR); Yunpeng Li, Nam-gu (KR); Zeeshan Kaleem, Nam-gu (KR)

(73) Assignee: INHA-Industry Partnership Institute (CN)

( * ) Notice: Subject to any disclaimer, the term of this patent is extended or adjusted under 35 U.S.C. 154(b) by 0 days.

(21) Appl. No.: 15/104,128

(22) PCT Filed: Dec. 2, 2015

(86) PCT No.: PCT/KR2015/013012
§ 371 (c)(1),
(2) Date: Apr. 24, 2017

(87) PCT Pub. No.: WO2016/204359
PCT Pub. Date: Dec. 22, 2016

(65) Prior Publication Data
US 2017/0223713 A1 Aug. 3, 2017

(30) Foreign Application Priority Data

Jun. 16, 2015 (KR) .......................... 10-2015-0085249

(51) Int. Cl.
*H04W 72/00* (2009.01)
*H04W 72/08* (2009.01)
(Continued)

(52) U.S. Cl.
CPC ......... *H04W 72/082* (2013.01); *H04W 8/005* (2013.01); *H04W 72/0453* (2013.01); *H04W 72/048* (2013.01); *H04W 84/042* (2013.01)

(58) Field of Classification Search
CPC . H04M 1/72519; H04W 72/04; H04W 16/14; H04W 28/04; H04W 72/082;
(Continued)

(56) References Cited

U.S. PATENT DOCUMENTS

| 2011/0312331 A1* | 12/2011 | Hakola | ............... H04W 72/085 455/452.2 |
| 2014/0376458 A1* | 12/2014 | Ryu | .................... H04W 72/085 370/329 |

(Continued)

FOREIGN PATENT DOCUMENTS

| KR | 1020100101280 | 9/2010 |
| KR | 1020110033079 | 3/2011 |

(Continued)

*Primary Examiner* — Danh Le
(74) *Attorney, Agent, or Firm* — John V. Daniluck; Bingham Greenebaum Doll LLP

(57) ABSTRACT

A method and apparatus for an interference-aware resource-sharing scheme for multiple D2D group communications is provided. The method for interference-aware resource-sharing scheme for multiple D2D communications includes initializing a D2D communication request and deciding the numbers of D2D pairs and CUEs, grouping D2D pairs according to the decided numbers of the D2D pairs and CUEs, selecting target CUEs for the grouped D2D pairs to share frequency resources, applying interference alignment to the D2D groups, updating the set of the CUEs and D2D pairs, and moving the rest of the D2D pairs to the orthogonal group.

10 Claims, 7 Drawing Sheets

(51) Int. Cl.
*H04W 8/00* (2009.01)
*H04W 72/04* (2009.01)
*H04W 84/04* (2009.01)

(58) Field of Classification Search
CPC ............. H04W 8/005; H04W 72/0453; H04W 72/048; H04W 84/042
USPC ................ 455/450, 63.1, 550.1; 370/329
See application file for complete search history.

(56) References Cited

U.S. PATENT DOCUMENTS

| | | | |
|---|---|---|---|
| 2015/0148049 A1* | 5/2015 | Alberth, Jr. | H04W 72/042 455/450 |
| 2015/0208401 A1* | 7/2015 | Lu | H04W 76/021 455/452.1 |
| 2015/0351089 A1* | 12/2015 | Li | H04W 72/082 455/426.1 |
| 2015/0373730 A1* | 12/2015 | Fujishiro | H04L 1/0003 455/450 |
| 2016/0037322 A1* | 2/2016 | Nguyen | H04W 8/005 370/329 |
| 2016/0242268 A1* | 8/2016 | McGeoch | H05G 2/005 |
| 2016/0255669 A1* | 9/2016 | Fodor | H04B 7/0413 370/329 |
| 2016/0353450 A1* | 12/2016 | Miao | H04W 24/02 |
| 2017/0027015 A1* | 1/2017 | Wijesinghe | H04W 72/042 |
| 2017/0188381 A1* | 6/2017 | Lopes Batista | H04W 72/1231 |

FOREIGN PATENT DOCUMENTS

| | | |
|---|---|---|
| KR | 1020110089311 | 8/2011 |
| KR | 1020130134821 | 12/2013 |
| KR | 1020150007233 | 1/2015 |

\* cited by examiner

METHOD AND APPARATUS FOR INTERFERENCE-AWARE RESOURCE-SHARING SCHEME FOR MULTIPLE D2D GROUP COMMUNICATIONS UNDERLAYING CELLULAR NETWORKS

CROSS-REFERENCE TO RELATED APPLICATIONS

A claim for priority under 35 U.S.C. § 119 is made to Korean Patent Application No. 10-2015-0085249 filed Jun. 16, 2015, in the Korean Intellectual Property Office, the entire contents of which are hereby incorporated by reference.

BACKGROUND

Embodiments of the inventive concept described herein relate to a method and apparatus for interference-aware resource-sharing scheme for multiple device-to-device (D2D) group communications underlaying cellular networks.

D2D communications have the advantages of supporting a higher date rate, lowering communications delay, and reducing energy consumption, which has been considered as a key technology for future 5G mobile communication systems. D2D communications are regarded as key technology for 5G systems. Therefore, D2D communications may be helpful in accomplishing low energy consumption as well as high data rates and low communication delays. In D2D communications, D2D pairs can operate in two modes: dedicated resource with direct link, and reusing resource with direct link.

Since the mode of reusing resource with direct link mode potentially leads to better network performance in terms of spectrum efficiency and user access rate, especially when the traffic loads in the network are heavy. Thus, it has become the main target for the D2D communications.

However, in reusing resource with direct link mode, D2D pairs share the same frequency resource with cellular users (CUEs). This generates Co-Channel Interference (CCI) among D2D pairs and CUEs to guarantee more complicated QoS requirements. Therefore, the CCI between D2D pairs and CUEs is the main challenge for D2D communications underlaying cellular networks.

Multiple CUEs and D2D pairs may be co-existed in a cell. Multiple D2D pairs forms a group for sharing the frequency resource and forms multiple D2D groups in a cell. The eNB has an Adaptive Antenna Array (AAA).

FIG. 1 illustrates a system model with multiple D2D pairs in a cellular network.

CUEs and D2D groups/pairs share the same frequency resources, whereas users' frequency resources may be shared by one D2D group/pair at most.

FIGS. 2A to 2C illustrate intra-cell downlink interference scenarios.

All CUEs and D2D pairs coincidently operate and other D2D pairs of the same group share the same frequency resource. Hereupon, as illustrated in FIGS. 2A to 2C, it needs to consider 3 types of Down Link (DL) intra-cell interference.

Referring to FIGS. 2A to 2C, there are 3 types of DL intra-cell interference: (a) interference to D2D from eNB Tx; (b) interference to a user from D2D Tx; and (c) interference to another D2D Rx from D2D Tx.

IA is an effective interference management approach that has been proposed. By using IA, multiple D2D pairs forms a group to share the same Resource Blocks (RBs). This improves the system throughput and reduces interference among different D2D pairs in a group. Adaptive antenna array (AAA) is an advanced technology that offers a significantly improved solution to reduce the interference and improve the system capacity.

Therefore, it is suitable for the coexisting D2D pairs and CUEs when they are sharing the same frequency resources, and it is possible to obtain zero gain outside of half power bandwidth (HPBW).

As at most one D2D group shares RBs with CUEs, thus the interference between the D2D pairs and CUEs is the main target to be managed. Therefore, it is necessary to improve cell performance and to propose a spectrum sharing technique for solving the issues of CCI.

SUMMARY

Embodiments of the inventive concept provide a method and apparatus for HPBW calculation. If the HPBW is small, more CUEs may be selected as the candidates for sharing frequency resources. Accordingly, this may increase the probability of selecting the optimal shared CUE for sharing frequency resources.

Embodiments of the inventive concept also provide a method and apparatus for deciding the number of D2D pairs in each group. The number of D2D pairs in each group may affect the computational complexity in the design, and may affect the system performance.

Embodiments of the inventive concept also provide a method and apparatus for a final design subject which is a kind of Interference Alignment (IA) suitable for an interference scenario. There are two ways in implementing IA. The first is symbol-extended IA and the other is the support of multiple antennas at each terminal.

Embodiments of the inventive concept provide a spectrum sharing scheme for solving the subjects to improve cell performance and for solving an issue of CCI.

In accordance with an aspect of the inventive concept, a method for interference-aware resource-sharing scheme for multiple D2D communications may include initializing a D2D communication request and deciding the numbers of D2D pairs and CUEs, grouping D2D groups according to the decided numbers of the D2D pairs and CUEs, selecting target CUEs for the grouped D2D groups to share frequency resources, applying interference alignment to the D2D groups, updating a set of the CUEs and D2D pairs, and moving the rest of the D2D pairs to an orthogonal group.

The initializing of the D2D communication request and the deciding of the numbers of the D2D pairs and CUEs may include determining whether $3 \leq l_{max} \leq N$ and if $3 \leq l_{max} \leq N$, determining whether the number of the CUEs is zero, determining whether $3 \leq N \leq l_{max}$ and if $3 \leq N \leq l_{max}$, determining whether the number of CUEs is zero, determining whether $0 < N \leq 2$ and if $0 < N \leq 2$, determining whether the number of the CUEs is zero, and if N=0, terminating a process for interference-aware and resource-sharing scheme for the multiple D2D group communications.

The grouping of the D2D groups according to the decided numbers of the D2D pairs and CUEs may include if $3 \leq l_{max} \leq N$ and unless the number of the CUEs is zero, selecting two nearest D2D pairs to decide a first D2D pair and a second D2D pair and deciding other D2D pairs until an $l_{max}$'th D2D pair in the order of distance, if $3 \leq N \leq l_{max}$ and unless the number of the CUEs is zero, selecting two nearest D2D pairs to decide a first D2D pair and a second D2D pair and deciding other D2D pairs until an N'th D2D pair in the order of distance, and if 0<N≤2 and unless the number of the CUEs is zero, selecting a D2D pair and calculating angles between the D2D pair and all of the CUEs.

The selecting of the target CUEs for the grouped D2D groups to share frequency resources may include calculating angles between the D2D pair and all of the CUEs and if the angles agree with a condition, selecting corresponding CUEs for frequency resource-sharing candidates, and calculating distances between the D2D pair and the CUEs that are selected for the resource-sharing candidates.

If the angles disagree with the condition, a corresponding D2D may move to the orthogonal group.

The selecting of the D2D pair, if 0<N≤2 and unless the number of the CUEs is zero, and the calculating of the angles between the D2D pair and all of the CUEs may include selecting corresponding CUEs for frequency resource-sharing candidates, if the angles agrees with a condition, and calculating distances between the D2D pair and the CUEs that are selected for the resource-sharing candidates.

If the angles disagree with the condition, a corresponding D2D may move to the orthogonal group.

The updating of the set of the CUEs and the D2D pairs may include finding a CUE, which has the furthest distance from the D2D pairs, and selecting the CUE for sharing frequency resources having the D2D pairs.

The moving of the rest of the D2D pairs to the orthogonal group may include moving the rest of the D2D pairs, which are permitted to use independent and periodic frequency resources, to the orthogonal group and performing a PF scheduling in consideration for resource allocation between the D2D pairs.

In accordance with another aspect of the inventive concept, an apparatus for interference-aware resource-sharing for multiple group communications may include an initializing and detecting part configured to initialize a D2D communication request and to decide the numbers of D2D pairs and CUEs, a grouping part configured to group D2D groups according to the decided numbers of the D2D pairs and CUEs;

a selecting part configured to select target CUEs for the grouped D2D groups to share frequency resources, an interference removing part configured to apply interference alignment to the D2D groups, an updating part configured to update a set of the CUEs and D2D pairs, and a sharing part configured to move the rest of the D2D pairs to an orthogonal group.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Ahead of the description, embodiments of the inventive concept will be based on the following assumptions.

Firstly, if the number of antenna arrays at the eNB is S, each User Equipment (UE) may be equipped with Q antennas, and M CUEs and N D2D pairs may be uniformly distributed over the cell Nearby D2D pairs may form D2D groups such as G={$g_1, g_2, \ldots, g_k$}, where G may denote a collection of all possible D2D groups.

Assuming that $g_k$ is k-th D2D group, k is the total number of D2D groups and N is the number of D2D pairs. The D2D pairs in each group are not overlapped, i.e., $g_k \cap g_t = 100$, k≠t. The number of D2D pairs in all groups may be unequal to N, because some D2D pairs cannot form D2D groups.

If there are no available CUEs to be shared by the D2D groups/pairs, frequency resources adopted by the D2D groups/pairs may be orthogonal to those of the CUEs. Therefore, interference may not be generated between the CUEs and the D2D groups/pairs. $G_m$ denotes a set of D2D pairs in one D2D group which can share the same frequency resource with $CUE_m$.

Figure 3:
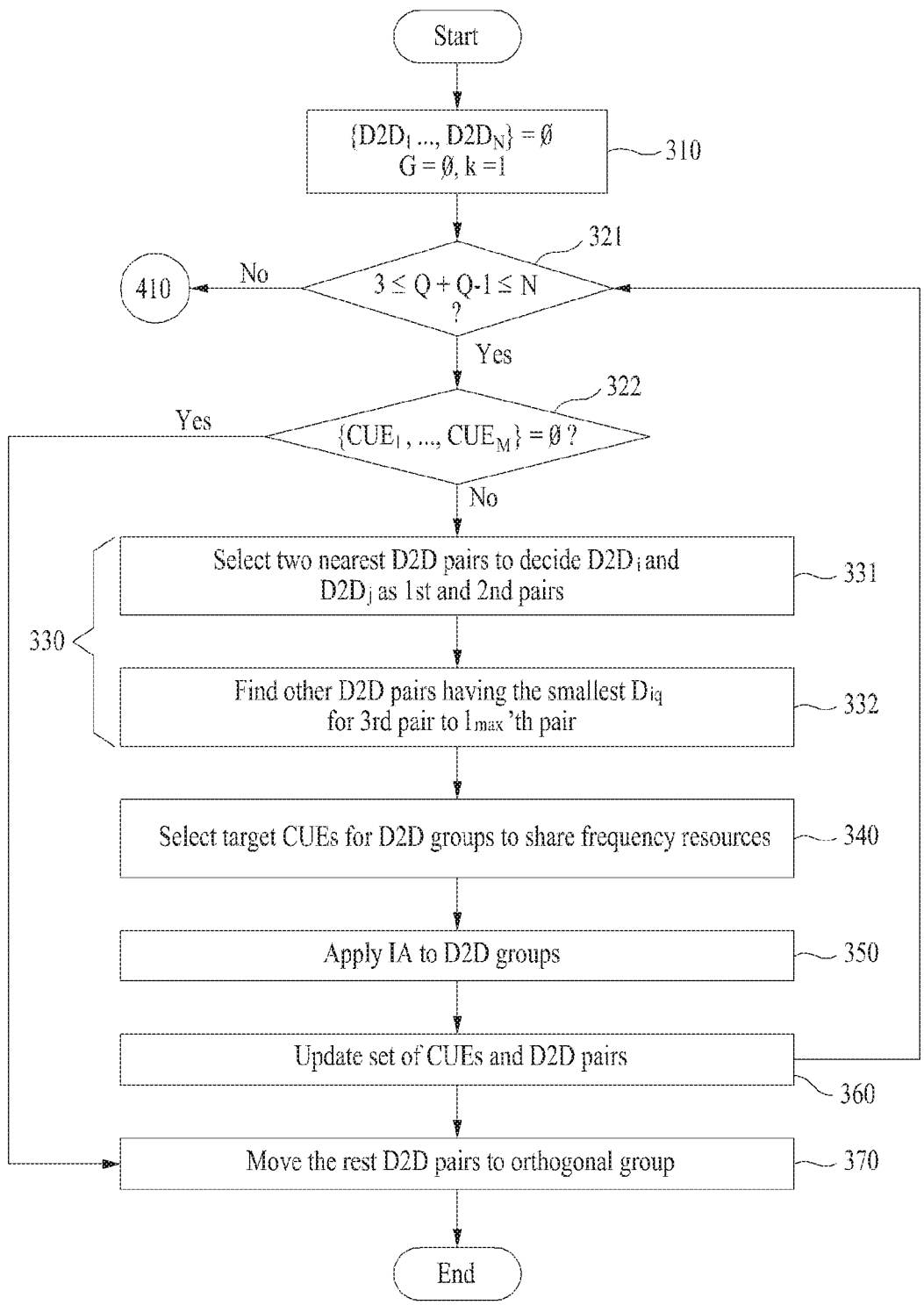
FIG. 3 is a flow chart showing a method for interference-aware and resource-sharing scheme for multiple D2D group communications according to an embodiment of the inventive concept.

The number of allowable D2D pairs in each D2D group may satisfy the feasibility constraint of IA. Accordingly, the number of D2D pairs allowed in each group is $l_{max} = 2Q-1$, but the actual number of D2D pairs in each group is based on the decision conditions as indicated in FIG. 3 due to the limit of number of D2D pairs in system.

For example, if the decision condition is $3 \leq l_{max} \leq N$, $l_{max}$ and 3 may determine the upper and lower bounds of the number of D2D pairs in each group, respectively. Similarly, if the condition is $3 \leq N \leq l_{max}$, then N and 3 determine the upper and lower bounds of the number of D2D pairs in each group, respectively. In the case of $0 \leq N \leq 2$, there is no requirement to perform grouping method, because it cannot any gain from IA. As the relative distance between $D2D_{Tx}$ and $D2D_{Rx}$ of a D2D pair is significantly smaller than the cell radius and also in order to reduce the computational complexity, the location of $D2D_{Rx}$ is considered as the reference location of D2D pair.

Figure 1:
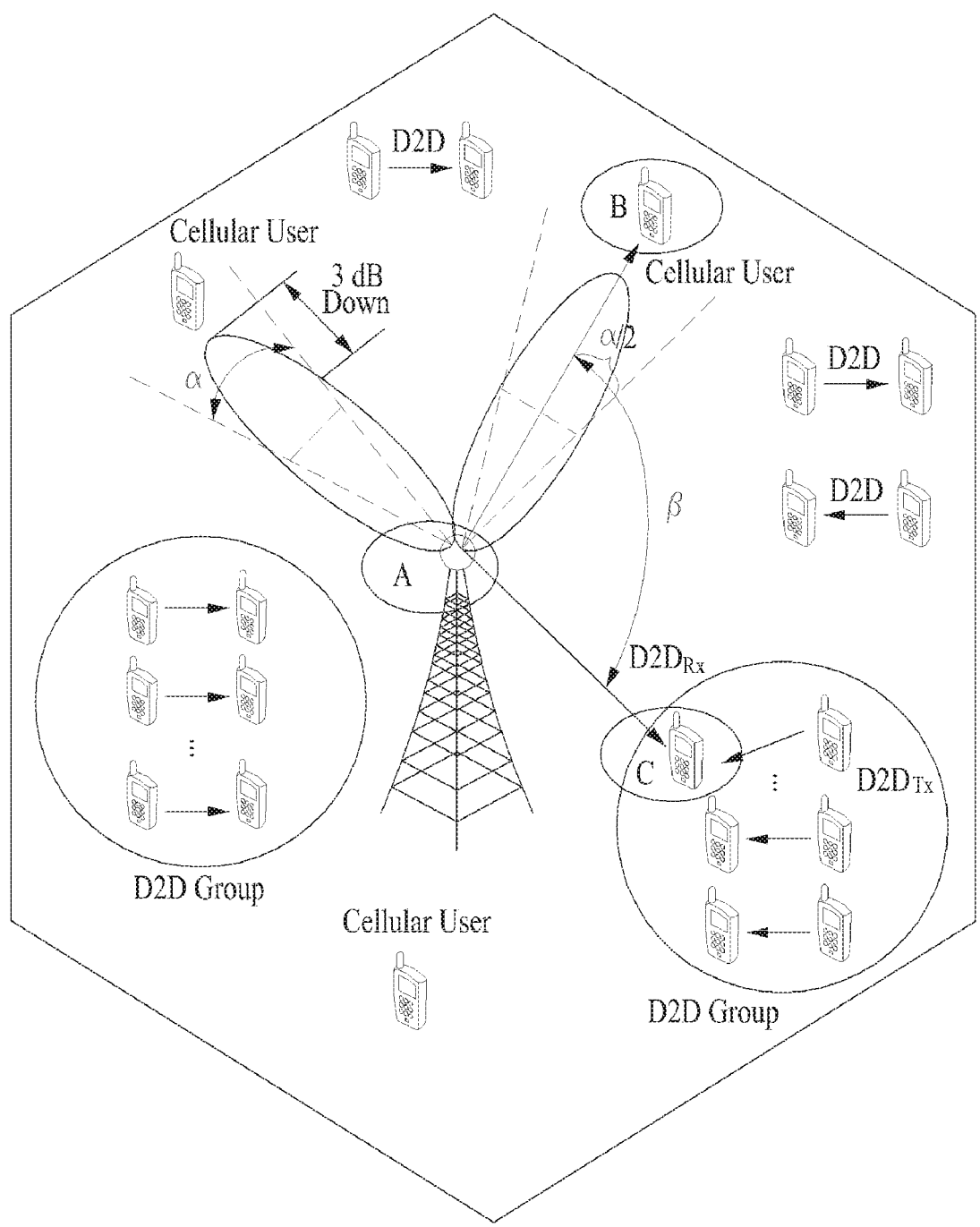
FIG. 1 illustrates a system module of multiple D2D pairs in a cellular network.
Figure 2:
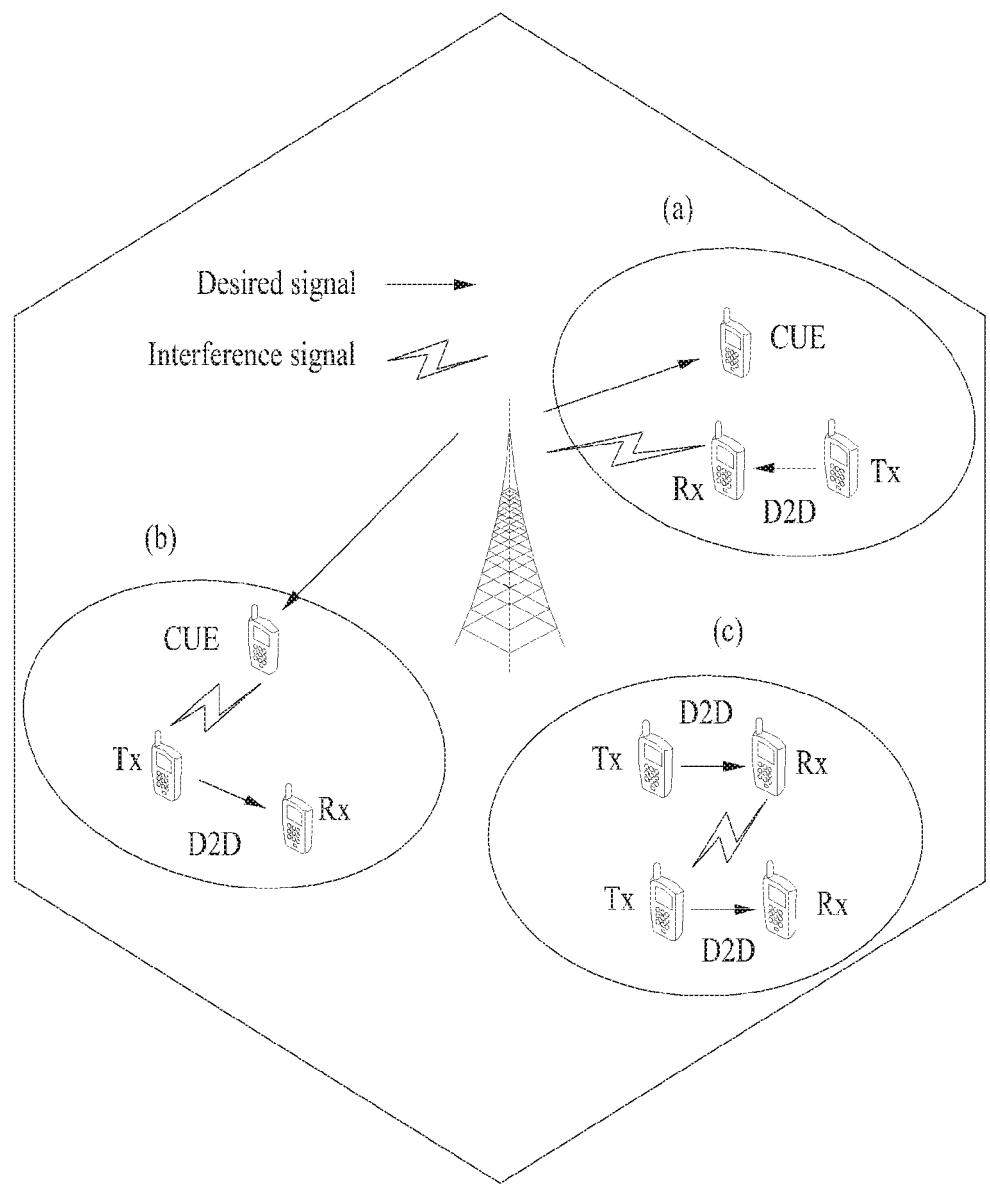
FIGS. 2A to 2C illustrate an intra-cell DL interference scenario.

As illustrated in FIG. 1, $\beta_{mi}$ is defined as an angle between $CUE_m$ and $D2D_i$, which may be calculated as follows.

The coordinates of eNB, $CUE_m$ and $D2D_i$ are denoted as: $A=(x_{eNB}, y_{eNB})$, $B_m=(x_{CUE_m}, y_{CUE_m})$, and $C_i=(x_{D2D_i}, y_{D2D_i})$, respectively. The vector between eNB and $CUE_m$ is $\vec{AB}_m=(x_{CUE_m}-x_{eNB}, y_{CUE_m}-y_{eNB})$ and the vector between eNB and $D2D_i$ is $\vec{AC}_i=(x_{D2D_i}-x_{eNB}, y_{D2D_i}-y_{eNB})$. $\beta_{mi}$ is the angle between $\vec{AB}_m$ and $\vec{AC}_i$, i.e., $\beta_{mi}=\angle(\vec{AB}_m, \vec{AC}_i)$. Then, the calculation may be given as follows.

$$\beta_{mi} = \arccos\left[\frac{\vec{AB}_m \cdot \vec{AC}_i}{(|\vec{AB}_m| \times |\vec{AC}_i|)}\right] \quad \text{[Equation 1]}$$

$\alpha_m$ is the Half Power Beam Width (HPBW) of $CUE_m$, and $\alpha_m$ may influence the system performance. $g^\perp$ may denote an orthogonal group. $N^\perp$ may denote the number of D2D pairs in orthogonal groups.

The technology proposed by embodiments of the inventive concept may improve system performance and reduce interference between CUEs and D2D groups/pairs, and may prevent interference between different D2D pairs in the same group.

It is necessary to consider the distance between CUEs and D2D groups/pairs. If the distance is longer, it may be possible to reduce the interference from D2D groups/pairs to CUEs.

According to embodiments, in order to reduce the interference from eNB to D2D communications, AAA may be applied to eNB. HPBW and distance factors may be used as the decision conditions for selecting a shared CUE.

For efficiently removing interference between different D2D pairs, it may be permissible to apply a technique of multiple antennas IA for D2D groups.

For reducing interference from D2D groups/pairs to CUEs, it may be permissible to select the CUEs for frequency resources sharing with the D2D groups/pair, which has a long distance between them. Additionally, it may be considered that the number of D2D pairs is insufficient to satisfy a grouping condition for forming groups.

Accordingly, if there are no available CUEs for frequency resource sharing with D2D communication, the D2D groups/pairs may be necessary to individually share a spectrum of CUE, and these D2D pairs only need to utilize the technique of grouping and IA (GIA).

Embodiments of the inventive concept are focused on a scenario that D2D groups/pairs and CUEs may share the same RBs. Each of CUE's RBs may be shared in one group at maximum. Therefore, it may be possible to manage interference between D2D groups/pairs and CUEs. Interference between D2D pairs and CUEs will be a main target to be managed by embodiments of the inventive concept. For that reason, a spectrum sharing technique will be proposed for improving cell performance and solving an issue of CCI. Hereafter, embodiments of the inventive concept will be described in conjunction with the accompanied figures.

FIG. 3 is a flow chart showing a method of interference-aware resource-sharing scheme for multiple D2D group communications according to an embodiment of the inventive concept.

The method of interference-aware resource-sharing scheme for multiple D2D group communications may include the steps of initializing a D2D communication request (310), deciding the numbers of D2D pairs and CUEs (321, 322), grouping D2D pairs according to the decided number of D2D pairs and CUEs (330), selecting target CUEs for the grouped D2D pairs to share frequency resources (340), applying interference alignment to the D2D groups (350), updating a set of the CUEs and D2D pairs (360), and moving the rest of the D2D pairs to an orthogonal group (370).

In the step 310 of initializing the D2D communication request, multiple CUEs may be in connection while all D2D pairs are transmitting connection requests to eNB. The set of D2D groups is empty at the initial time.

The steps 321 and 322 of deciding the number of the D2D pairs and CUEs may include steps of determining whether $3 \leq l_{max} \leq N$ (321), determining whether the number of the CUEs is zero in the case of $3 \leq l_{max} \leq N$ (322), determining whether $3 \leq N \leq l_{max}$ (411), determining whether the number of CUEs is zero in the case of $3 \leq N \leq l_{max}$ (412), determining whether $0 < N \leq 2$ (511), determining whether the number of the CUEs is zero in the case of $0 < N \leq 2$ (512), and if N=0, terminating a process for interference-aware resource-sharing scheme for the multiple D2D group communications.

In the inequalities, 3 may denote the lower bound of D2D pairs in the group, $l_{max}$ and N may denote the upper bound of the D2D pairs in the group.

In the case of $3 \leq l_{max} \leq N$, if it satisfies the above condition, the process goes to step 330. In the case of the number of CUEs is zero, the process goes to step 370 to form orthogonal groups and then the process is terminated.

In the case of $3 \leq N \leq l_{max}$, if it satisfies the above condition, the process goes to 421, and then it further determines whether the number of CUEs is zero. In the case that the number of CUEs is not zero, the process goes to the step 420. In the case of the number of CUEs is zero, the process goes to the step 370 to form orthogonal groups and then the process is terminated.

In the case of $0 < N \leq 2$, if it satisfies the above condition, it further determines whether the number of CUEs is zero. In the case that the number of CUEs is not zero, the process goes to step 513. In the case of the number of CUEs is zero, the process goes to the step 370 to form orthogonal groups and then the process is terminated. Also in the case of N=0, the process is terminated. This will be further described in conjunction with FIG. 6.

The step of grouping the D2D groups is that, selecting two nearest D2D pairs as the first D2D pair and second D2D pair (331) in the case of $3 \leq l_{max} \leq N$ and, when the number of the CUEs is not zero. Furthermore, selecting other D2D pairs until the maximum number of D2D pairs is $l_{max}$ based on the distance restriction (332).

This process may be called the grouping method 1. The grouping method 1 may operate to select two nearest D2D pairs which are denoted by $D2D_i$ and $D2D_j$. These two D2D pairs may be selected as the first pair and second pair in the k'th group.

Then, other D2D pairs having the smallest distance $d_{iq}$ may be found and selected as the third D2D pair, the fourth D2D pair, . . . , and the $l_{max}$'th D2D pair in a group based on the grouping method 1. The $d_{iq}$ denotes a distance between an i'th D2D pair and a q'th D2D pair, i.e., $d_{iq}$ with $q \in \{1, 2, \ldots, N\}$, $q \neq i$.

Figure 4:
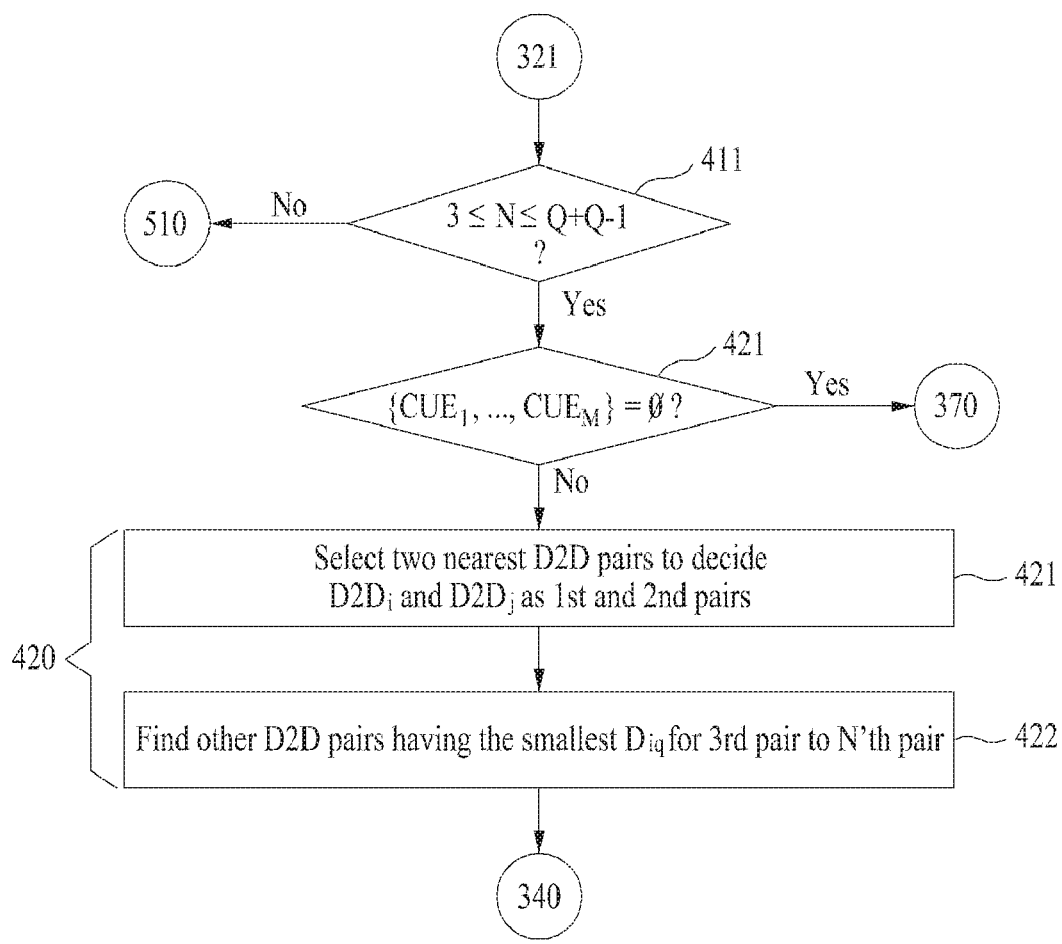
FIG. 4 is a flow chart showing a method for grouping D2D groups with the numbers of decided D2D pairs and CUEs according to an embodiment of the inventive concept.

FIG. 4 is a flow chart showing a method for grouping D2D pairs according to an embodiment of the inventive concept.

After determining whether $3 \leq l_{max} \leq N$ (321), it may determine whether $3 \leq N \leq l_{max}$ in the case of dissatisfying $3 \leq l_{max} \leq N$ (411). Then, in the case of $3 \leq N \leq l_{max}$, it may further determine whether the number of CUEs is zero (412).

In the case of $3 \leq N \leq l_{max}$ and that the number of CUEs is not zero, two nearest D2D pairs may be selected as the first D2D pair and second D2D pair (421), and other D2D pairs may be selected until to the N'th D2D pair based on the distance.

Then, the process proceeds from the step 340 to select the target CUEs for the grouped D2D groups to share frequency resources.

This may be called the grouping process 2. In more detail, two nearest D2D pairs may be selected as $D2D_i$ and $D2D_j$. These two D2D pairs may be selected as the first pair and the second pair in the k'th D2D group.

Then other D2D pairs having the smallest distance may be found and selected respectively as the third D2D pair, the fourth D2D pair, . . . , and the N'th D2D pair in a group based on the grouping method 2. Afterward, the process goes to the step 340.

Figure 5:
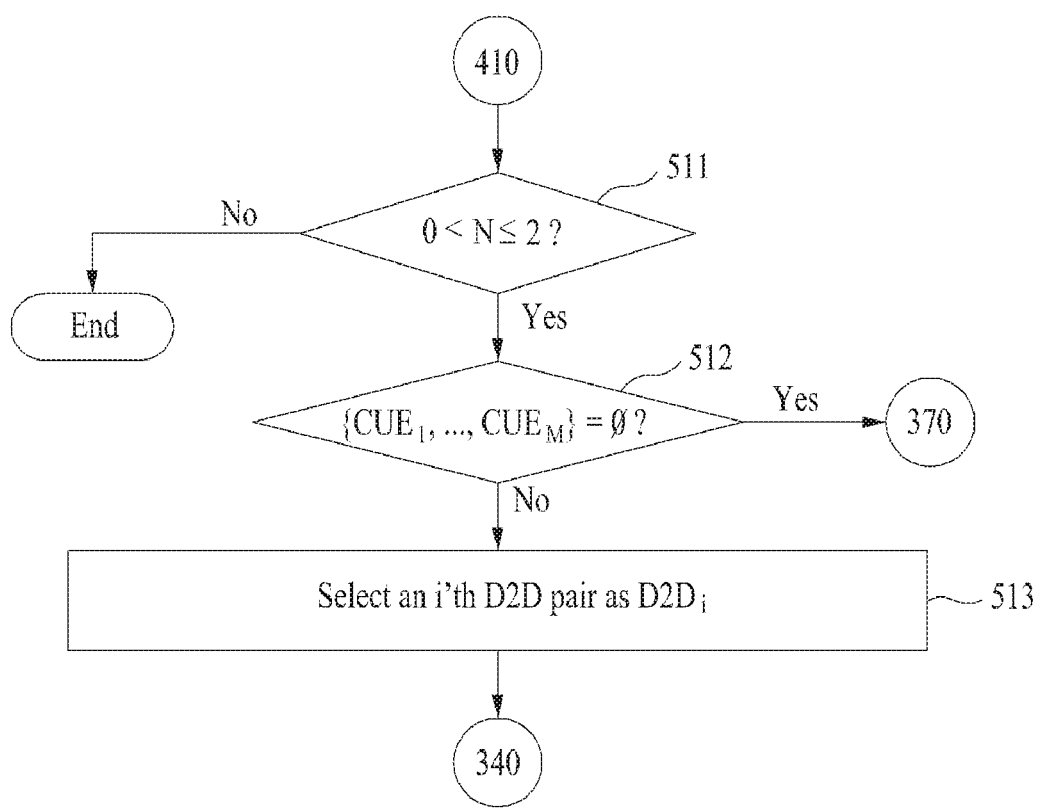
FIG. 5 is a flow chart showing a method for grouping D2D groups with the numbers of decided D2D pairs and CUEs according to another embodiment of the inventive concept.

FIG. 5 is a flow chart showing a method for grouping D2D pairs with the numbers of decided D2D pairs and CUEs according to another embodiment of the inventive concept.

After determining $3 \leq N \leq l_{max}$ (411), it will determine whether $0 < N \leq 2$ in the case of dissatisfying the $3 \leq N \leq l_{max}$ (511). Then, in the case of $0 < N \leq 2$, it determines whether the number of CUEs is zero (512).

In the case of $0 < N \leq 2$ and that the number of the CUEs is not zero, a D2D pair may be selected, and the angles between the D2D pair and all CUEs may be calculated (513). Then, the process proceeds from the step 340 to select target CUEs for grouped D2D groups to share frequency resources.

In the case of $0 < N \leq 2$ and that the number of the CUEs is not zero, the step 513 is to form the D2D group, and then using the 340 to calculate the angles between the D2D pair and all CUEs which is used to select the corresponding CUEs as frequency resource-sharing candidates if the angles satisfies the specific condition. Then, it may further calculate the distance between the D2D pair and CUEs which are selected as the resource-sharing candidates CUE. Contrarily, in the case that the angles disagree with the specific condition, the corresponding D2D may move to an orthogonal group.

For example, the i'th D2D pair, i.e., $D2D_i$, may be selected randomly, and then calculating the angles between the $D2D_i$ and all CUEs, i.e., angles between $\beta_{1i}, \beta_{2i}, \ldots,$ and $\beta_{Mi}$, may be calculated. Then it determines whether $\beta_{mi} \geq \alpha_m/2$, $\beta_{mi} \in \{\beta_{1i}, \beta_{2i}, \ldots, \beta_{Mi}\}$. In the case of agreeing with $\beta_{mi} \geq \alpha_m/2$, $\beta_{mi} \in \{\beta_{1i}, \beta_{2i}, \ldots, \beta_{Mi}\}$, the process may go to the next calculation step. In the case of disagreeing with $\beta_{mi} \geq \alpha_m/2$, $\beta_{mi} \in \{\beta_{1i}, \beta_{2i}, \ldots, \beta_{Mi}\}$, the $D2D_i$ may move to an orthogonal group $g^\perp$. These orthogonal groups may use orthogonal frequency resources, which may be determined by the GIA technique. However, the corresponding CUEs agreeing with $\beta_{mi} \geq \alpha_m/2$, $\beta_{mi} \in \{\beta_{1i}, \beta_{2i}, \ldots, \beta_{Mi}\}$ may be selected as candidates for sharing frequency resources with D2D groups/pairs.

Then, distances between the $D2D_i$ and the selected CUEs may be calculated. After finding a CUE which is most far from the $D2D_i$ with the largest distance, and then the furthest CUE may be selected as the frequency resources sharing with the D2D group/pair, which includes the $D2D_i$. Thereafter, the process may go to the step 350.

The step 340 of selecting target CUEs for the grouped D2D groups for sharing frequency resources may calculate angles between the D2D pair and all CUEs. In the case that the angles agreed with a specific condition, corresponding CUEs may be selected as the resource-sharing candidates. Then, it may calculate distances between the D2D pair and the CUEs which are selected as the resource-sharing candidates. In the case that the angle disagrees with the specific condition, a corresponding D2D may move to an orthogonal group.

In more detail, angles between the $D2D_i$ and all CUEs, i.e., angles between $\beta_{1i}, \beta_{2i}, \ldots,$ and $\beta_{Mi}$, may be calculated. Then, it may determine whether $\beta_{mi} \geq \alpha_m/2$, $\beta_{mi} \in \{\beta_{1i}, \beta_{2i}, \ldots, \beta_{Mi}\}$. In the case of agreeing with $\beta_{mi} \geq \alpha_m/2$, $\beta_{mi} \in \{\beta_{1i}, \beta_{2i}, \ldots, \beta_{Mi}\}$, the process may go to the next calculation step. In the case of disagreeing with $\beta_{mi} \geq \alpha_m/2$, $\beta_{mi} \in \{\beta_{1i}, \beta_{2i}, \ldots, \beta_{Mi}\}$, the $D2D_i$ may move to an orthogonal group $g^\perp$. Those orthogonal groups may use orthogonal frequency resources, which may be determined by the GIA technique. Corresponding CUEs agreeing with $\beta_{mi} \geq \alpha_m/2$, $\beta_{mi} \in \{\beta_{1i}, \beta_{2i}, \ldots, \beta_{Mi}\}$ may be selected as candidates for sharing frequency resources.

Then, distances between the $D2D_i$ and the selected CUEs may be calculated. After finding a CUE which is most far from the $D2D_i$ with the largest distance, the furthest CUE may be selected for sharing frequency resources with the D2D group/pair which includes the $D2D_i$.

Next, in the step 350, it may be permissible to apply IA for the D2D groups.

The step 360 of updating a set of the CUEs and D2D pairs may find a CUE which is most far from the D2D pairs with the largest distance. The CUE may be selected for sharing frequency resource with the D2D pairs.

The selected CUEs and D2D pairs may be removed and then the set of CUEs and D2D pairs may be updated. In the case that one of two sets is empty, the above step may be repeated from the step 321. Unless one of two sets is empty, the step is terminated.

In the step 370 of moving the rest of the D2D pairs to an orthogonal group, the rest D2D pairs which may use independent and additional frequency resources for the CUEs. A PF scheduling may be performed in consideration for frequency resource allocation among the D2D pairs.

This is because there is no CUE, but still has remaining D2D pairs which may use independent and additional frequency resources. Therefore, in this case, there is no interference between D2D groups/pairs and CUEs. Applications of the grouping process 1, the grouping process 2, and IA may be utilized through this technical scheme. A PF scheduling may be performed for these D2D groups/pairs in consideration of frequency resource allocation between the D2D groups/pairs.

Figure 6:
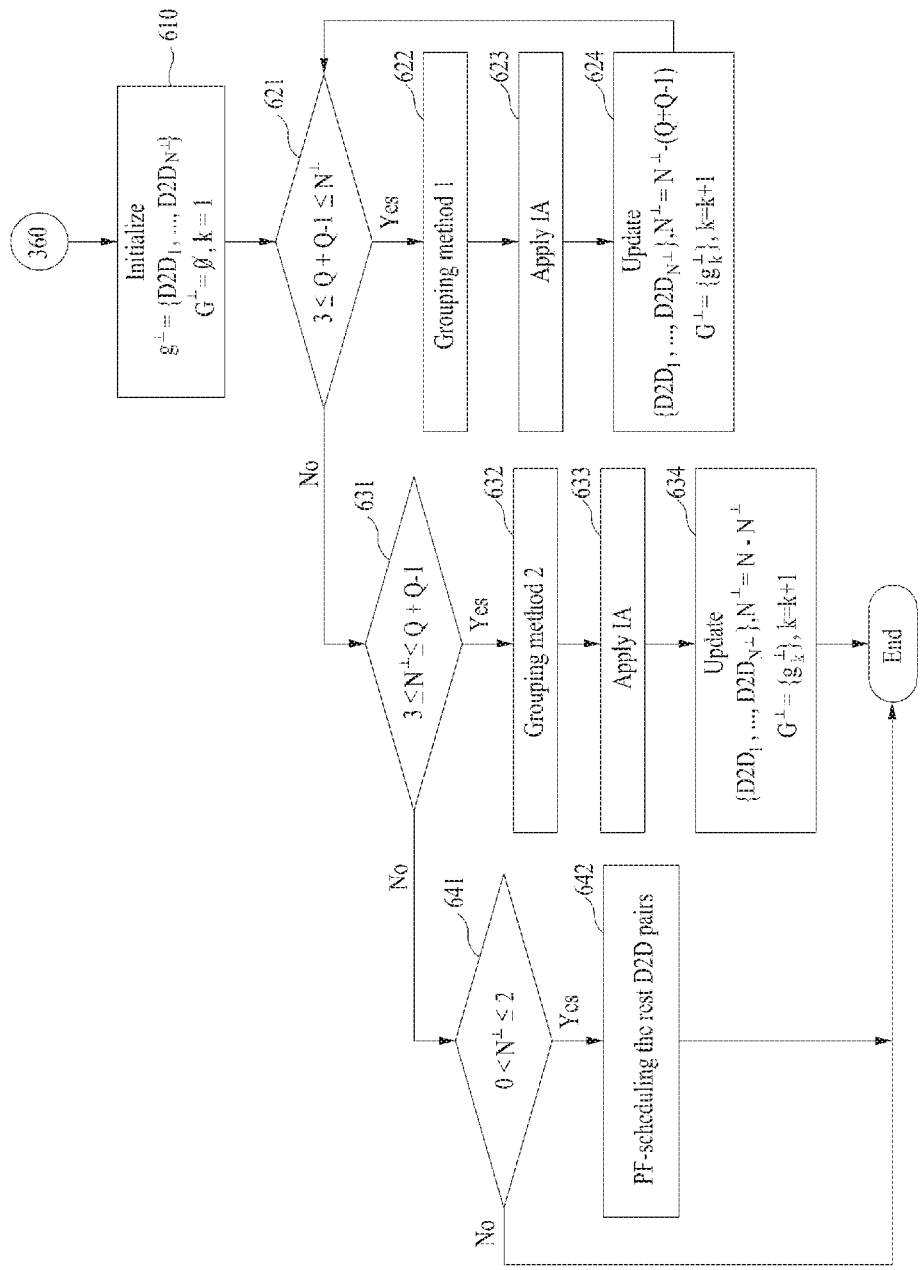
FIG. 6 is a flow chart showing a process of moving the rest of D2D pairs to an orthogonal group according to an embodiment of the inventive concept.

FIG. 6 is a flow chart that shows the process of moving the rest of D2D pairs to an orthogonal group according to an embodiment of the inventive concept.

An orthogonal group $g^\perp$ may be initialized (610) and it may determine whether $3 \leq Q+Q-1 \leq N^\perp$ (621). Then, in the case of agreeing with $3 \leq Q+Q-1 \leq N^\perp$, the grouping process 1 may be performed (622) and IA may be applied to (623). An orthogonal group may be updated (624) and the process may repeat from the step 621.

In the case of disagreeing with $3 \leq Q+Q-1 \leq N^\perp$, it may determine whether $3 \leq N^\perp \leq Q+Q-1$ (631). Then, in the case of agreeing with $3 \leq N^\perp \leq Q+Q-1$, the grouping process 2 may be performed (632) and IA may be applied to (633). The orthogonal group may be updated (634) and the process may be terminated.

In the case of disagreeing with $3 \leq N^\perp \leq Q+Q-1$, it may determine whether $0 < N^\perp \leq 2$ (631). Then, in the case of agreeing with $0 < N^\perp \leq 2$, a PF scheduling may be performed for the rest D2D pairs (642) and the process may be terminated. Also in the case of disagreeing with $0 < N^\perp \leq 2$, the process may be terminated.

Figure 7:
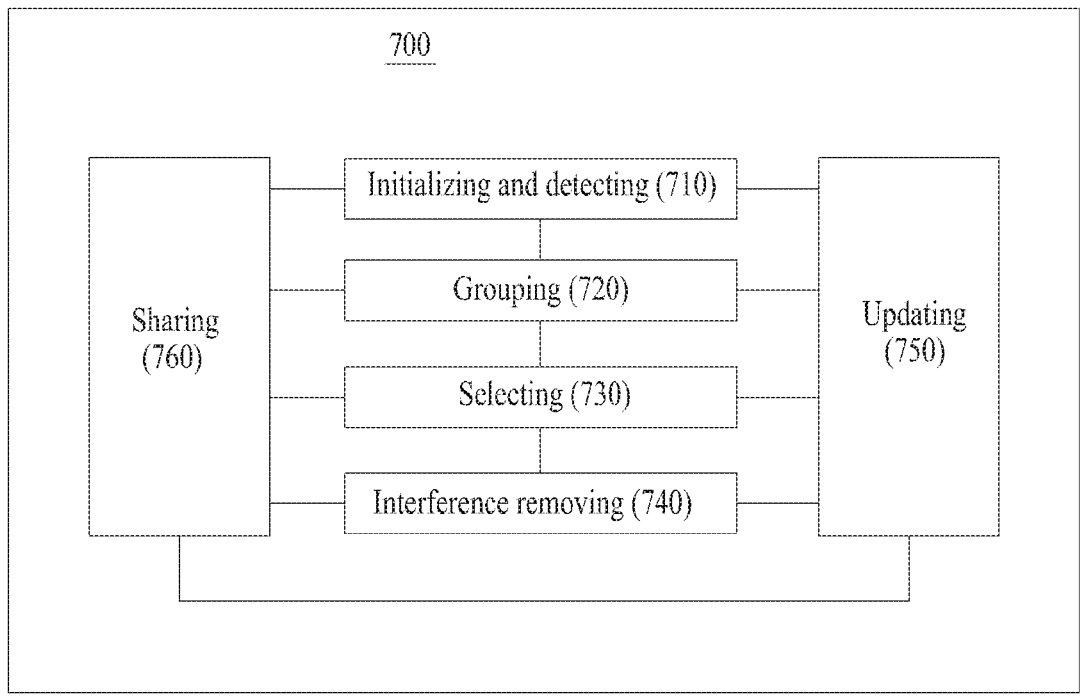
FIG. 7 illustrates a configuration of an apparatus for interference-aware resource-sharing scheme for multiple D2D group communications according to an embodiment of the inventive concept.

FIG. 7 illustrates a configuration of an apparatus for interference-aware resource-sharing scheme for multiple D2D group communications according to an embodiment of the inventive concept.

An apparatus 700 for interference-aware resource-sharing scheme for multiple D2D group communications may include an initializing and detecting part 710, a grouping part 720, a selecting part 730, an interference removing part 740, an updating part 750, and a sharing part 760.

The initializing and detecting part 710 may initialize a D2D communication request and may decide the number of D2D pairs and CUEs.

While all D2D pairs are transmitting connection requests to eNB, multiple CUEs may be in connection. A set of D2D groups may be empty.

The initializing and detecting part 710 may determine whether $3 \leq l_{max} \leq N$. In the case of $3 \leq l_{max} \leq N$, the initializing and detecting part 710 may determine whether the number of CUEs is zero. And, the initializing and detecting part 710 may determine whether $3 \leq N \leq l_{max}$. In the case of $3 \leq N \leq l_{max}$, the initializing and detecting part 710 may determine whether the number of CUEs is zero. The initializing and detecting part 710 may determine whether $0 < N \leq 2$. In the case of $0 < N \leq 2$, the initializing and detecting part 710 may determine whether the number of CUEs is zero. In the case of N=0, the process for interference-aware resource-sharing scheme for multiple D2D group communications may be terminated. The inequalities, 3 may denote the lower bound of D2D pairs in the group, $l_{max}$, may denote the upper bound of the D2D pairs in the group, and N denotes the number of the D2D pairs.

The grouping part 720 may perform a process for grouping D2D pairs according to the decided numbers of D2D pairs and CUEs.

In the case of $3 \leq N \leq l_{max}$ and the number of CUEs is not zero, two nearest D2D pairs may be selected to decide the first D2D pair and the second D2D pair. The other D2D pairs may be decided until the maximum number of D2D pairs in the D2D group is $l_{max}$'th based on the distance criterion.

This process may be called the grouping process 1. The grouping process 1 may operate to select two nearest D2D pairs which are denoted by $D2D_i$ and $D2D_j$. These two D2D pairs may be selected as the first pair and the second pair in the k'th group.

Then, other D2D pairs with the smallest distance $d_{iq}$ may be found and selected as the third D2D pair, the fourth D2D pair, . . . , and the $l_{max}$'th D2D pair in the group based on the grouping method 1. The $d_{iq}$ denotes the distance between the i'th D2D pair and the q'th D2D pair, i.e., $d_{iq}$ with $q \in \{1, 2 . . . , N\}$, $q \neq i$.

The grouping part 720 may determine whether $3 \leq l_{max} \leq N$. The grouping part 720 may determine whether $3 \leq N \leq l_{max}$ in the case of disagreeing $3 \leq l_{max} \leq N$. Then, in the case of $3 \leq N \leq l_{max}$, the grouping part 720 may determine whether the number of CUEs is zero (412).

In the case of $3 \leq N \leq l_{max}$ and that the number of CUEs is not zero, two nearest D2D pairs may be selected to decide the first D2D pair and the second D2D pair (421), and other D2D pairs may be decided until the N'th D2D pair in the order of near distance.

This may be called a grouping process 2. In more detail, two nearest D2D pairs may be selected as $D2D_i$ and $D2D_j$. These two D2D pairs may be selected as the first pair and the second pair in the k'th group.

Then, other D2D pairs with the smallest distance may be found and selected respectively as the third D2D pair, the fourth D2D pair, . . . , and the N'th D2D pair in the group based on the grouping method 2.

After determining $3 \leq N \leq l_{max}$, the grouping part 720 may determine whether $0 < N \leq 2$ in the case of disagreeing with $3 \leq N \leq l_{max}$. Then, in the case of $0 < N \leq 2$, the grouping part 720 determine whether the number of CUEs is zero. In the case of $0 < N \leq 2$ and that the number of the CUEs is not zero, the D2D pair may be selected and angles between the D2D pair and all CUEs may be calculated.

In the case of $0 < N \leq 2$ and that the number of the CUEs is not zero, a D2D pair may be selected. When calculating angles between the D2D pair and all CUEs, corresponding CUEs may be selected as frequency resource-sharing candidates in the case of the angles agree with a specific condition. Then, the grouping part 720 may calculate distances between the D2D pair and CUEs which are selected as the resource-sharing candidates. Contrarily, in the case that the angles disagree with the specific condition, a corresponding D2D may move to an orthogonal group.

For example, the i'th D2D pair, i.e., $D2D_i$, may be selected randomly and angles between the $D2D_i$ and all CUEs, i.e., $\beta_{1i}, \beta_{2i}, \ldots,$ and $\beta_{Mi}$, may be calculated. Then the grouping part 720 may determine whether $\beta_{mi} \geq \alpha_m/2$, $\beta_{mi} \in \{\beta_{1i}, \beta_{2i}, \ldots, \beta_{Mi}\}$. In the case of agreeing with $\beta_{mi} \geq \alpha_m/2$, $\beta_{mi} \in \{\beta_{1i}, \beta_{2i}, \ldots, \beta_{Mi}\}$, the process may go to the next calculation step. In the case of disagreeing with $\beta_{mi} \geq \alpha_m/2$, $\beta_{mi} \in \{\beta_{1i}, \beta_{2i}, \ldots, \beta_{Mi}\}$, the $D2D_i$ may move to an orthogonal group $g^\perp$. Other orthogonal groups may use orthogonal frequency resources, which may be determined by a GIA technique. Corresponding CUEs agreeing with $\beta_{mi} \geq \alpha_m/2$, $\beta_{mi} \in \{\beta_{1i}, \beta_{2i}, \ldots, \beta_{Mi}\}$ may be selected as candidates for sharing frequency resources.

Then, distances between the $D2D_i$ and the selected CUEs may be calculated. After finding a CUE which is most far from the $D2D_i$ in the largest distance, the furthest CUE may be selected for sharing frequency resources with the D2D group/pair including the $D2D_i$.

The selecting part 730 may select target CUEs for the grouped D2D pairs for sharing frequency resources.

The selecting part 730 may calculate angles between the D2D pair and all CUEs. In the case that the angles agreed with a specific condition, corresponding CUEs may be selected as the resource-sharing candidates. Then, the selecting part 730 may calculate distances between the D2D pair and the CUEs which are selected as the resource-sharing candidates. In the case that the angle disagrees with the specific condition, a corresponding D2D may move to an orthogonal group.

In more detail, angles between the $D2D_i$ and all CUEs, i.e., $\beta_{1i}, \beta_{2i}, \ldots,$ and $\beta_{Mi}$, may be calculated. Then, the selecting part may determine whether $\beta_{mi} \geq \alpha_m/2$, $\beta_{mi} \in \{\beta_{1i}, \beta_{2i}, \ldots, \beta_{Mi}\}$. In the case of agreeing with $\beta_{mi} \geq \alpha_m/2$, $\beta_{mi} \in \{\beta_{1i}, \beta_{2i}, \ldots, \beta_{Mi}\}$, the process may go to the next calculation step. In the case of disagreeing with $\beta_{mi} \geq \alpha_m/2$, $\beta_{mi} \in \{\beta_{1i}, \beta_{2i}, \ldots, \beta_{Mi}\}$, the $D2D_i$ may move to an orthogonal group $g^\perp$. Other orthogonal groups may use orthogonal frequency resources, which may be determined by a GIA technique. Corresponding CUEs agreeing with $\beta_{mi} \geq \alpha_m/2$, $\beta_{mi} \in \{\beta_{1i}, \beta_{2i}, \ldots, \beta_{Mi}\}$ may be selected as candidates for sharing frequency resources.

Then, distances between the $D2D_i$ and the selected CUEs may be calculated. After finding a CUE which is most far from the $D2D_i$ in the largest distance, the furthest CUE may be selected for sharing frequency resources with the D2D group/pair which includes the $D2D_i$.

The interference removing part 740 may apply IA for the D2D groups.

The updating part 750 may update the set of the CUEs and D2D pairs. The updating part 750 may find a CUE which is most far from the D2D pairs in the largest distance. The CUE may be selected for sharing frequency resources with the D2D pairs. The selected CUEs and D2D pairs may be removed and the set of CUEs and D2D pairs may be updated.

The sharing part 760 may move the rest of the D2D pairs to an orthogonal group.

The sharing part 760 may move the rest D2D pairs, which may use independent and additional frequency resources for the CUEs. A PF scheduling may be performed in consideration for frequency resource allocation among the D2D pairs.

This is because there are no CUEs in the system, but still has remaining D2D pairs which may use independent and additional frequency resources. Therefore, in this case, there is no interference between D2D groups/pairs and CUEs. Applications of the grouping process 1, the grouping process 2, and IA may be needed through this technical scheme. A PF scheduling may be performed for these D2D groups/pairs in consideration of frequency resource allocation among D2D groups/pairs.

Embodiments of the inventive concept may propose an interference-aware resource-sharing scheme for multiple D2D group communications in a cellular network based on AAA and IA.

Such an application of AAA may help the signal aim toward to a specific direction. Therefore, it may be useful for sharing frequency resources between CUEs and D2D groups/pairs, thus improving the system performance.

With respect to the grouping process, the IA may be efficient in removing interference among different D2D pairs in the same group. Additionally, the IA with multiple antennas may greatly increase the degree of freedom of channel in comparison with the symbol-extension IA. Accordingly, it may be allowable to potentially improve the system performance. Additionally, embodiments of the inventive concept may consider distances between D2D groups/pairs and CUEs. Accordingly, it may be allowable to reduce interference from D2D groups/pairs to CUEs due to the large fading of path loss.

An apparatus described above may be implemented in hardware elements, software elements, and/or a combination of hardware and software elements. For example, an apparatus, unit, or element described above may be implemented with one or more universal or special computers, such as processor, controller, Arithmetic Logic Unit (ALU), digital signal processor, microcomputer, Field Programmable Gate Array (FPGA), Programmable Logic Unit (PLU), microprocessor, or other units capable of executing and responding instructions. A processing unit may perform an Operating System (OS) and one or more software applications executed in the OS. Additionally, a processing unit may access, store, control, and generate data in response to software executions. Although some embodiment is illustrated as employing one processing unit for convenience of understanding, it can be seen by those skilled in the art that a plurality and/or diversity of processing elements may be included in use. For example, a processing unit may include a plurality of processors or one processor and one controller. Additionally, a processing unit may be formed in other processing configuration like a parallel processor.

Software may include computer programs, codes, instructions, or one or more combinations with them, may configure a processing unit, or may instruct a processing unit independently or collectively. For being interpreted by a processing unit or for providing instructions or data to a processing unit, software and/or data may be embodied permanently or temporarily in some kind of machine, component, physical apparatus, virtual equipment, computer storage medium or unit, or transmitted signal wave. Software may be distributed in computer systems connected through a network and may be stored and executed in distribution. Software and data may be stored in one or more computer-readable recording media.

Methods according to embodiments may be implemented in the form of program instructions executable through diverse computing means and may be recorded in computer readable media. The computer readable media may include independently or associatively program instructions, data files, data structures, and so on. Program instructions recorded in the media may be specially designed and configured for embodiments, or may be generally known by those skilled in the computer software art. Computer readable recording media may include magnetic media such as hard disks and floppy disks, optical media such as CD-ROM and DVD, magneto-optical media such as floptical disks, and hardware units, such as ROM, RAM, flash memory, and so on, which are intentionally formed to store and perform program instructions. Program instructions may include high-class language codes executable by computers using interpreters, as well as machine language codes likely made by compilers. The hardware units may be configured to function as one or more software modules for performing operations according to embodiments of the present disclosure, and vice versa.

According to embodiments of the inventive concept, it may be accomplishable to improve system efficiency, to reduce interference between CUEs and D2D groups/pairs, and to prevent interference between different D2D pairs in the same group. Additionally, with respect to distances between CUEs and D2D groups/pairs, information about the distances may contribute to reducing interference to CUEs from D2D groups/pairs.

While embodiments of the inventive concept have been shown and described with reference to the accompanying drawings thereof, it will be understood by those skilled in the art that various changes and modifications in form and details may be made therein without departing from the spirit and scope of the inventive concept as defined by the appended claims and their equivalents. For example, it may be allowable to achieve desired results although the embodiments of the present disclosure are preformed in other sequences different from the descriptions, and/or the elements, such as system, structure, device, circuit, and so on, are combined or assembled in other ways different from the descriptions, replaced or substituted with other elements or their equivalents.

Therefore, other implementations, other embodiments, and equivalents of the appended claims may be included in the scope of the appended claims.

What is claimed is:

1. A method for interference-aware resource-sharing scheme for multiple device-to-device (D2D) communications, the method comprising:
   initializing the D2D communication request and deciding the number of D2D pairs and cellular users (CUEs);
   grouping D2D pairs according to the decided number of the D2D pairs and CUEs;
   selecting target CUEs for the grouped D2D pairs to share frequency resources;
   applying interference alignment to the D2D groups;
   updating the set of CUEs and D2D pairs;
   moving the rest of the D2D pairs to orthogonal group.

2. The method of claim 1, wherein the initializing of the D2D communication request and the deciding of the number of the D2D pairs and CUEs comprises:
   determining whether $3 \leq L_{max} \leq N$ and if $3 \leq L_{max} \leq N$, determining whether the number of the CUEs is zero;
   determining whether $3 \leq N \leq L_{max}$ and if $3 \leq N \leq L_{max}$, determining whether the number of CUEs is zero;)
   determining whether $0 < N \leq 2$ and if $0 < N \leq 2$, determining whether the number of the CUEs is zero;
   if $N=0$, terminating the process of interference-aware resource-sharing scheme for the multiple D2D group communications, wherein N is an integer greater than or equal to 0 as the number of D2D pairs, and $L_{max}$ is an integer greater than or equal to 3 as a predetermined upper bound of the number of D2D pairs.

3. The method of claim 2, wherein the grouping of D2D pairs according to the decided number of the D2D pairs and CUEs comprises:

if $3 \leq L_{max} \leq N$ and unless the number of the CUEs is zero, selecting two nearest D2D pairs as the first D2D pair and the second D2D pair and selecting other D2D pairs until an $L_{max}$'th D2D pair in the order of distance;

if $3 \leq N \leq L_{max}$ and unless the number of the CUEs is zero, selecting two nearest D2D pairs as the first D2D pair and the second D2D pair and selecting other D2D pairs until the N'th D2D pair in the order of distance;

if $0 < N \leq 2$ and unless the number of the CUEs is zero, selecting one D2D pair and calculating angles between the D2D pair and all of the CUEs.

4. The method of claim 1, wherein the selecting of the target CUEs for the grouped D2D groups to share frequency resources comprises:

calculating angles between the D2D pair and all of the CUEs and if the angles satisfy the condition, selecting corresponding CUEs for frequency resource-sharing candidates, and calculating distances between the D2D pair and the CUEs that are selected as the resource-sharing candidates.

5. The method of claim 4, wherein if the angles disagree with the condition, the corresponding D2D moves to the orthogonal group.

6. The method of claim 3, wherein, if $0 < N \leq 2$ and unless the number of the CUEs is zero, the selecting of said one D2D pair, and the calculating of the angles between the D2D pair and all of the CUEs comprises:

if the angles satisfies the condition, selecting corresponding CUEs for frequency resource-sharing candidates and calculating distances between the D2D pair and the CUEs that are selected as the resource-sharing candidates.

7. The method of claim 6, wherein if the angles dissatisfy with the condition, a corresponding D2D moves to the orthogonal group.

8. The method of claim 1, wherein the updating of the set of the CUEs and the D2D pairs comprises:

finding a CUE, which has the furthest distance from the D2D pairs, and selecting the CUE for sharing frequency resources with the D2D pairs.

9. The method of claim 1, wherein the moving of the rest of the D2D pairs to the orthogonal group comprises:

moving the rest of the D2D pairs, which are permitted to use independent and periodic frequency resources, and performing the PF scheduling in consideration for the resource allocation among the D2D pairs.

10. An apparatus for interference-aware resource-sharing for multiple group communications, the apparatus comprising:

an initializing and detecting part configured to initialize a device-to-device (D2D) communication request and to decide the number of D2D pairs and cellular users (CUEs);

a grouping part configured to group D2D pairs according to the decided number of the D2D pairs and CUEs;

a selecting part configured to select target CUEs for the grouped D2D pairs to share frequency resources;

an interference removing part configured to apply interference alignment to the D2D groups;

an updating part configured to update a set of the CUEs and D2D pairs;

a sharing part configured to move the rest of the D2D pairs to the orthogonal group.

* * * * *